United States Patent Office 3,314,249
Patented Apr. 18, 1967

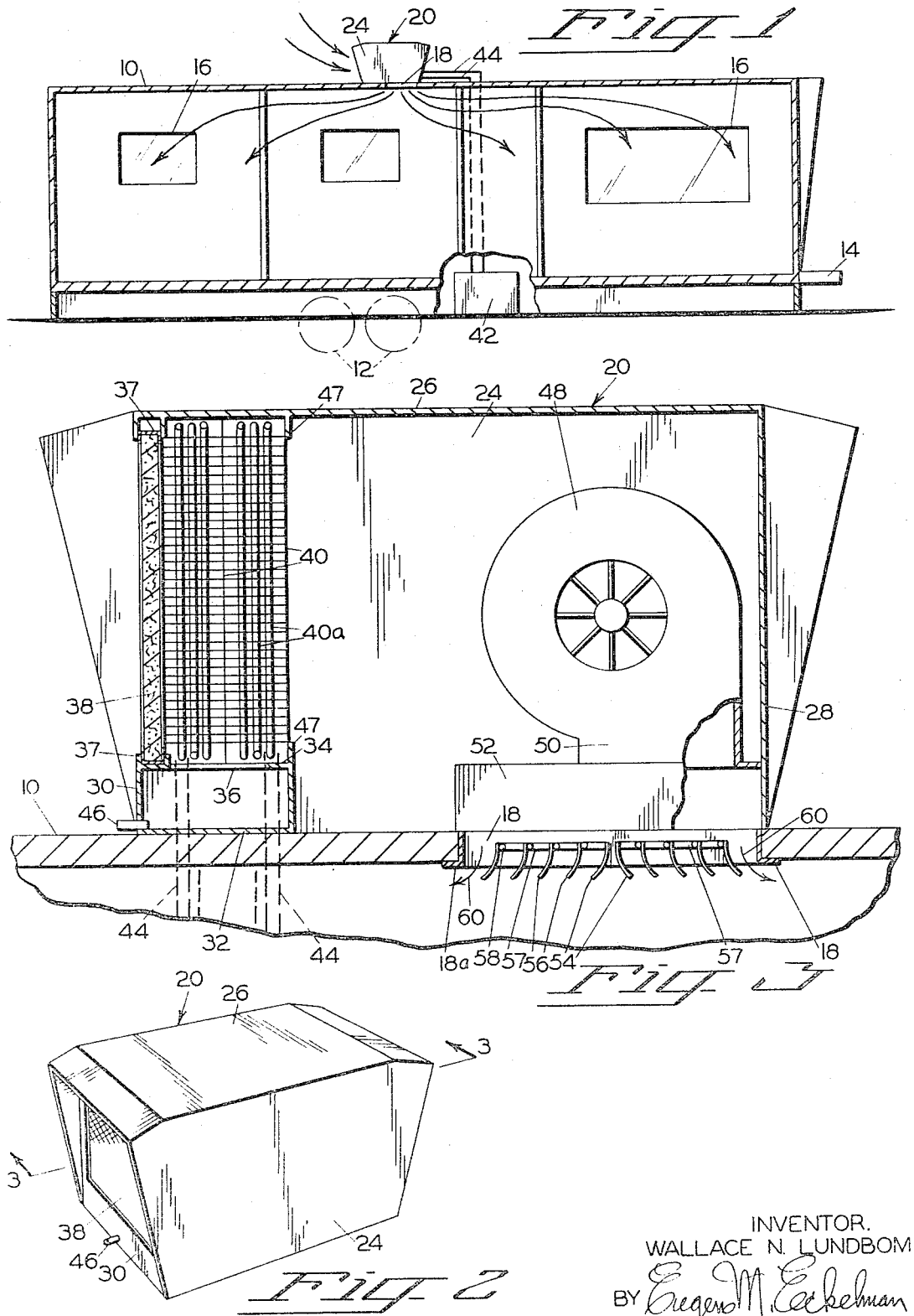

3,314,249
AIR CONDITIONING METHOD AND APPARATUS FOR TRAILERS
Wallace N. Lundbom, Portland, Oreg., assignor to Ramco, Inc., Portland, Oreg., a corporation of Oregon
Filed May 10, 1965, Ser. No. 454,452
2 Claims. (Cl. 62—244)

This invention relates to air conditioning systems and more particularly pertains to a new and useful method and apparatus for air conditioning enclosures such as house trailers.

It has heretofore been found difficult to efficiently air condition those types of trailers which serve as mobile homes. Such difficulty is believed to stem principally from the fact that such trailers are of rather large size but yet are poorly insulated. That is, in order to be reasonably light in weight to make it possible to transport them from one place to another, the wall construction of the trailers is thin and a minimum of insulation is provided. Furthermore, since upper stories are not present and peaked roofs or the like are not utilized, the ceiling is more or less directly exposed to the sun and heat radiates readily downwardly into the trailer. Further yet, the heating ducts of house trailers are too small to convey the volume of air necessary for air conditioning.

It is a primary objective of the present invention to provide an air conditioning method and apparatus for trailers which is arranged to accomplish great efficiency.

Other important objects of the present invention are to provide an air conditioning system for trailers which has a selected capacity whereby to pressurize the interior of the trailer, thus eliminating inflow of warm air through various inlets in the trailers such as doors, windows, ducts or the like and also maintaining a layer of cool air adjacent the ceiling; which circulates all fresh outside air and does not recirculate any inside air; and which reduces the humidity of the air before the air enters the trailer.

Still another object of the present invention is to provide an air conditioning system for trailers which is readily applied to existing structures and which, except in very large trailers, does not require the use of ducts.

Still another object is to provide an air conditioning system for trailers which is relatively inexpensive in its overall cost.

Additional objects will become apparent from the following specification and claims, considered together with the accompanying drawings, wherein the numerals of reference indicate like parts.

In the drawings:

FIGURE 1 is a longitudinal, vertical sectional view taken centrally of a conventional trailer and showing an air conditioning system of the present invention associated therewith;

FIGURE 2 is a perspective view of an air handling unit of the instant invention; and FIGURE 3 is an enlarged, longitudinal sectional view taken on the line 3—3 of FIGURE 2.

Referring first to FIGURE 1 there is shown a conventional trailer 10 supported on wheels 12 and having the usual front draw bar 14. This type of trailer has a plurality of windows 16, and of course also has doors not shown. Furthermore, these homes are provided with ventilation ducts or louvered openings, also not shown.

In addition, the usual mobile home trailer 10 has a vent opening 18 in its ceiling located substantially centrally thereof and covered with a vent hood and screen, not shown.

In accordance with the principles of the present invention, an air handling unit 20, shown in detail in FIGURES 2 and 3, is arranged to be supported on the top of the trailer 10 over the vent opening 18. It is to be understood that if the trailer is not provided with a vent opening 18 as shown such an opening can be cut therein. At any rate it is a feature of the present invention that the air handling unit 20 be supported on the top of the trailer at substantially the center thereof whereby cooled air can be directed efficiently to both ends.

Air handling unit 20 comprises a casing having side walls 24, a top wall 26, and a rear wall 28. The casing has no front wall, but integrated at the front end thereof is a transverse frame member or bracket 30 having a bottom wall 32 and a false bottom wall 34 provided with one or more openings 36. Adapted to be removably confined in opposed brackets 37 on the frame member 30 and on the upper portion of the casing is a filter 38 and a pair of cooling coil plate units 40. It is necessary that the filter 38 be removable, and for this purpose it is of less height than the upper and lower limits of mounting means therefor whereby it can merely be raised to clear the bottom bracket 37 and swung out at the bottom.

The cooling coil plate units 40 have coils 40a therein and are associated with a condensing unit 42, FIGURE 1, of conventional construction. Interconnection of the coils and the condenser unit is accomplished by means of suitable conduits 44. As seen in FIGURE 1, the condensing unit 42 is not supported on top of the trailer with the air handling unit but rather is supported elsewhere such as on the ground. Thus, only the air handling unit, which is light in weight, is supported on the top of the trailer and no excessive weight bears thereon.

The frame member 30, below the wall portion 34, forms a drip pan for catching moisture of condensation which may drip off the cooling coils 40a and flow downwardly through openings 36. A drain spout outlet 46 leads from the drip pan for draining off moisture which may collect in said pan. As apparent in FIGURE 3, two cooling plate units 40 are mounted behind the filter 38 for accomplishing cooling of air moving inwardly through the front end of the casing, these units being seated on the wall 34 and being secured in place in front of opposed rear flanges 47.

Secured in the air handling unit 20 is a blower 48 which may comprise a suitable conventional electric squirrel cage type blower or propeller type air mover. This blower has an outlet portion 50 secured to a downwardly opening base receptacle 52. In the installation of the air handling unit 20 the outlet of receptacle 52 is placed over the vent opening 18 of the trailer in order that cooled air forcefully discharged by the blower 48 will be directed into the trailer. The air handling unit 20 is preferably secured to the top of the trailer to prevent accidental displacement thereof, such securement being accomplished by any suitable means such as by metal screws, welding or the like.

Vent opening 18 is defined by a peripheral flanged frame 18a, and installed in this opening is a diffuser unit 54 comprising a plurality of louvers 56 secured on cross bars or shafts 58 pivotally supported on end bars 57 secured to the inner surface of the opening defining flange 18a. Preferably, as shown, the louvers 56 are arranged in two sets, one set being in the forward portion of the opening and the other being in the rear portion of the opening. The louvers are adjustable individually to selected air directing positions, and importantly extend crosswise or laterally of the trailer so that they can be caused to direct forced air from the blower 48 laterally along the ceiling of the trailer toward the far ends thereof. That is, the trailers with which the present invention will be used are generally greatly elongated with relation to their width, and it is thus desirable that the louvers be arranged to direct forced air toward the far ends of the trailer. The louvers 56 may be hand adjustable to various positions of fully open, fully closed, or intermediate positions. In order to efficiently direct air toward the ends of the trailer, the louvers are arcuate or concaved as shown in FIGURE 3 and forced air from the blower is directed in the path as shown by the arrows 60.

In accordance with the present invention an improved and more efficient air conditioning of trailers is achieved than with systems heretofore used. The improved air conditioning is believed to be the result of one or more features, as follows. The only air inlet for the air handling unit 20 is open to atmosphere and therefore the entire intake of air comprises outside air. No air whatsoever is recirculated. It has been found that it is much easier to cool one hundred percent outside air than to recirculate inside air. Another feature of the present invention which is believed to contribute to the efficiency thereof comprises the mounting of the air handling unit on the roof and utilizing a diffuser 54 having louvers arranged to direct forced air laterally along the undersurface of the ceiling and toward the far ends of the trailer. By this structure a layer of cooled air is held up along the undersurface of the ceiling. This layer of cold air cools the ceiling so that radiant heat from solar gain is minimized.

This air conditioner has a large air moving capacity and by inducing 100% outside air with the doors and windows shut, the interior of the trailer is pressured. Air escapes through door and window joints, as well as bathroom or kitchen vents and the like, but since the forced intake of air is of great volume there will be, as stated above, a pressure build up in the interior of the trailer. The pressurized interior prevents inflow of warm air through door joints, vents or the like.

Another feature which contributes to the efficiency of the present unit is that the humidity is taken out of the air before the air enters the trailer. That is, as the air passes over the cooling coils 40 moisture in the air condenses on the said coils. Thus, there is no recirculation of air inside the mobile home and the humidity of the air is substantially the same at all times.

It is to be noted that the present system does not use ducts for transporting air from the air handling unit to far ends of the trailer. Applicant has found that in the average size trailer ducts are not necessary since cooled air can be directed to the far ends of the trailer without being confined. Since ducts are not used, a greater volume of air can be moved and cooling of the trailer thus accomplished with less air flow. It may be desirable, in extra long trailers, to provide ducts leading to far rooms, but in general it is desirable that the air be diffused so that it is directed laterally across the ceiling for the purpose described.

As shown in FIGURE 3, a pair of cooling coil units 40 are employed each having three rows of coils. Thus, a six row coil arrangement is provided at the inlet opening of the air handling unit. It has been found that by providing such a six row cooling coil arrangement maximum efficiency is obtained for cooling the air. For example, it was found that when a three row coil arrangement was used the air was cooled approximately 18° but when a six row coil arrangement was used the air was cooled approximately 40°. Thus by utilizing a six row coil arrangement an efficient cooling of air is accomplished.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. In combination, a house trailer having a floor, a roof, and defining end and side walls forming with said floor and roof the living space of the trailer, said roof having an opening intermediate the ends of the trailer, air conditioning apparatus for said trailer including an air handling unit mounted on said roof exteriorly of the trailer, said air handling unit having an air inlet end communicating with the atmosphere only and an air outlet end in registry with said opening in the roof, a blower in said air handling unit for forcefully moving atmospheric air inwardly through said inlet end and outwardly through said air outlet end, whereby the air admitted forcefully to said trailer by the said apparatus comprises totally fresh air, cooling coils in said air handling unit in the path of movement of said air, and baffle means mounted in said opening, said baffle means being arranged to direct air substantially horizontally in adjacent relation to the under surface of said roof and in opposite directions toward the far ends of said trailer whereby to cool said trailer by moving air as well as to form an insulating layer of cool air adjacent the under surface of said roof to minimize radiation of heat through the latter.

2. In combination, a house trailer having a floor, a roof, defining end and side walls forming with said floor and roof the living space of the trailer, said side walls being substantially longer than the end walls whereby said living space is elongated with relation to its width, said roof having an opening intermediate the ends of the trailer, air conditioning apparatus for said trailer including an air handling unit mounted on said roof exteriorly of the trailer, said air handling unit having an air inlet end communicating with the atmosphere only and an air outlet end in registry with said opening in the roof, a blower in said air handling unit for forcefully moving atmospheric air inwardly through said inlet end and outwardly through said air outlet end, whereby the air admitted forcefully to said trailer by the said apparatus comprises totally fresh air, cooling coils in said air handling unit in the path of movement of said air, and baffle means mounted in said opening, said baffle means including one or more plates disposed transversely in said opening and arranged to direct air substantially horizontally in adjacent relation to the under surface of said roof and in opposite directions toward the far ends of said trailer whereby to cool said trailer by moving air as well as to form an insulating layer of cool air adjacent the under surface of said roof to minimize radiation of heat through the latter.

References Cited by the Examiner

UNITED STATES PATENTS

| | | | |
|---|---|---|---|
| 1,947,223 | 2/1934 | Ophuls | 62—89 |
| 2,320,035 | 5/1943 | Gould | 62—259 |
| 2,321,687 | 6/1943 | Kucher | 62—259 |
| 2,326,318 | 8/1943 | Anderson | 237—69 |
| 2,500,527 | 3/1950 | Demuth | 62—239 |
| 2,715,867 | 8/1955 | Kennedy | 98—40 |
| 2,727,456 | 12/1955 | Davies | 98—40 |
| 2,772,624 | 12/1956 | Carnes | 98—40 |
| 3,199,432 | 8/1965 | Brandi | 98—41 |

FOREIGN PATENTS 80,024    1/1963    France.

WILLIAM J. WYE, *Primary Examiner.*